(12) United States Patent
Gherini et al.

(10) Patent No.: US 11,473,689 B1
(45) Date of Patent: Oct. 18, 2022

(54) PASSIVE TUBE CLOSURE VALVE

(71) Applicant: National Technology & Engineering Solutions of Sandia, LLC, Albuquerque, NM (US)

(72) Inventors: Michael James Gherini, San Ramon, CA (US); Ryan K. Gehmlich, Mountain House, CA (US); Dorian K. Balch, Oakland, CA (US); Michael Christopher Maguire, Napa, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 101 days.

(21) Appl. No.: 17/069,257

(22) Filed: Oct. 13, 2020

(51) Int. Cl.
    *F16K 31/00*      (2006.01)
    *F03G 7/06*      (2006.01)

(52) U.S. Cl.
    CPC ............ *F16K 31/002* (2013.01); *F03G 7/065* (2013.01)

(58) Field of Classification Search
    CPC ........ F16K 31/002; F16K 49/005; F16K 7/06; F03G 7/065
    USPC ................................................... 251/129.06
    See application file for complete search history.

(56) References Cited

U.S. PATENT DOCUMENTS

| | | | | |
|---|---|---|---|---|
| 2,588,212 A | * | 3/1952 | Custer | F16K 7/06 251/5 |
| 3,055,631 A | * | 9/1962 | Kippenhan | F16K 31/007 251/333 |
| 3,497,175 A | | 2/1970 | Koland | |
| 3,614,486 A | * | 10/1971 | Smiley | B41J 9/36 251/303 |
| 4,463,560 A | * | 8/1984 | Greenleaf | F03G 7/065 60/527 |
| 4,488,680 A | * | 12/1984 | Itoh | G05D 23/132 236/100 |
| 4,586,335 A | * | 5/1986 | Hosoda | B25J 9/1085 60/527 |
| 4,811,564 A | * | 3/1989 | Palmer | F03G 7/065 60/527 |
| 4,945,727 A | * | 8/1990 | Whitehead | F03G 7/065 60/527 |
| 5,622,482 A | * | 4/1997 | Lee | F04B 53/04 417/415 |
| 6,279,869 B1 | * | 8/2001 | Olewicz | F16K 7/045 251/9 |

(Continued)

*Primary Examiner* — Umashankar Venkatesan
(74) *Attorney, Agent, or Firm* — Medley, Behrens & Lewis, LLC; Madelynne J. Farber; Mark A. Dodd

(57) ABSTRACT

A passive tube closure valve comprising an elongated body extending along a first axis made of a shape memory alloy with a threshold contraction along the first axis at a threshold temperature. The closure valve further comprises a passageway extending along a second axis different from the first axis shaped to surround a conduit line extending along the second axis. The closure valve further includes a first modifying structure on a first portion of the passageway and a second modifying structure on a second portion of the passageway opposite the first modifying structure. Contraction of the elongated body can cause the first modifying structure and the second modifying structure to move towards each other; where movement of at least one of the first modifying structure or the second modifying structures can be configured to modify the conduit line.

20 Claims, 12 Drawing Sheets

(56) References Cited

U.S. PATENT DOCUMENTS

| | | | |
|---|---|---|---|
| 7,104,275 B2* | 9/2006 | Dille | F16K 7/045 |
| | | | 251/48 |
| 7,255,321 B2 | 8/2007 | Tomioka et al. | |
| 7,971,651 B2 | 7/2011 | Tanju et al. | |
| 8,387,943 B1 | 3/2013 | Mattheis | |
| 9,206,789 B2* | 12/2015 | Foshansky | F03G 7/065 |
| 2012/0025113 A1 | 2/2012 | Stadelbauer et al. | |
| 2019/0003609 A1* | 1/2019 | Asai | F16K 11/022 |

* cited by examiner

PASSIVE TUBE CLOSURE VALVE

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

Conventionally, crimping a conduit line to prevent and/or stop fluid flow through a portion of the conduit line can be an arduous and complicated process. Historically, most of the options for sealing flow paths have involved valves with dissimilar (and possibly chemically vulnerable) wetted materials that are inserted into a break in a conduit line. The conventional valves require a break in the conduit line for insertion and the valve's components, such as packing, gate, etc., are continuously in contact with the fluid in the conduit line as the fluid flows through the conduit line potentially contaminating the fluid and/or degrading the components of the valve over time. The crimping process involves using either manually operated valves, electronic components, or some level of explosives to drive structures against the conduit line to crush the conduit line. Moreover, the process involves active monitoring of the environment at the crimping device, determining whether a threshold condition is met, and then sending a signal to the crimping device to crush the pipe and/or otherwise close the flow path.

SUMMARY

The following is a brief summary of subject matter that is described in greater detail herein. This summary is not intended to be limiting as to the scope of the claims.

In an exemplary embodiment, described herein is a passive tube closure valve configured to modify a conduit line, such as closing a flow path. The passive tube closure valve comprises an elongated body extending along a first axis. The elongated body comprises a shape memory alloy with a threshold contraction along the first axis at a threshold temperature. The passive tube closure valve further comprises a passageway extending along a second axis different from the first axis. The passageway may be shaped to surround a conduit line extending along the second axis. The passive tube closure valve further includes a first modifying structure on a first portion of the passageway and a second modifying structure on a second portion of the passageway opposite the first modifying structure. The first modifying structure can be connected to a first end of the elongated body and the second modifying structure can be connected to a second end of the elongated body. Contraction of the elongated body can cause the first modifying structure and the second modifying structure to move towards each other. Movement of at least one of the first modifying structure or the second modifying structures can be configured to modify the conduit line.

A method of forming a passive tube closure valve includes a step of forming a passageway for a conduit line between two parallel elongated bodies. The elongated bodies can extend along a first axis and the passageway can extend along a second axis different from the first axis. The elongated bodies comprise a shape memory alloy with a threshold contraction along the first axis at a threshold temperature. The method can further include arranging a first modifying structure along the passageway. The first modifying structure can be connected to a first end of the elongated bodies. The method can yet further include arranging a second modifying structure along the passageway. The first modifying structure and the second modifying structure can be arranged on opposing portions of the passageway. The second modifying structure can be connected to the other end of the elongated bodies. The contraction of the elongated bodies can cause the first modifying structure and the second modifying structure to move towards each other. Movement of at least one of the first modifying structure or the second modifying structures can be configured to modify the conduit line.

Further, in accordance with various aspects, provided is a passive tube closure valve comprising two parallel elongated bodies. Each elongated body can extend along a first axis. Each elongated body comprises a shape memory alloy with a threshold contraction along the first axis at a threshold temperature. The passive tube closure valve further includes a passageway extending between the two elongated bodies. The passageway extends along a second axis different from the first axis, wherein the passageway is shaped to surround a conduit line. A first plunger on a first portion of the passageway and a second plunger on a second portion of the passageway that is opposite the first portion. Contraction of the elongated bodies can cause the first plunger and the second plunger to move towards each other to compress space in the passageway The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
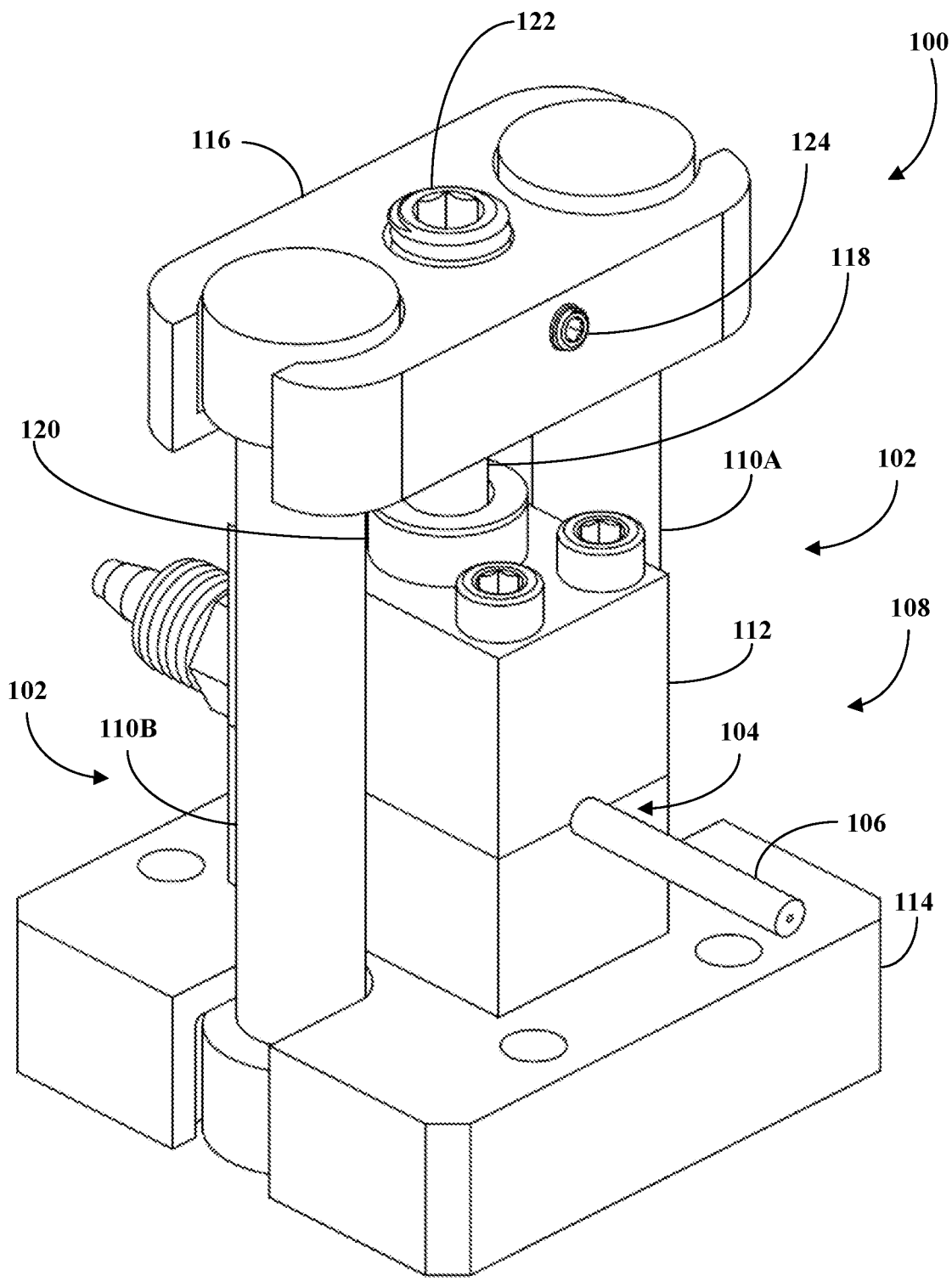
FIG. 1 illustrates an exemplary passive tube closure valve.

Various technologies pertaining to a passive tube closure valve are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details.

In reference to the disclosure herein, for purposes of convenience and clarity only, directional terms, such as, top, bottom, left, right, up, down, upper, lower, over, above, below, beneath, rear, and front, may be used. Such directional terms should not be construed to limit the scope of the features described herein in any manner. It is to be understood that embodiments presented herein are by way of example and not by way of limitation. The intent of the following detailed description, although discussing exemplary embodiments, is to be construed to cover all modifications, alternatives, and equivalents of the embodiments as may fall within the spirit and scope of the features described herein.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something and is not intended to indicate a preference.

Disclosed is an apparatus for modifying a conduit line in response to contraction of an elongated body(s). Conventionally, modifying the conduit line involves electronic or explosive components to drive structures into the conduit line to crimp it or requires a break in the conduit line for a valve to be inserted and the valve's components, such as packing, gate, etc., are continuously in contact with the fluid in the conduit line as the fluid flows through the conduit line potentially contaminating the fluid and/or degrading the components of the valve over time. Instead, the described apparatus uses an elongated body(s) that passively contracts in response to a particular environmental condition to drive modifying structures against the conduit line to crimp it. The crimping can prevent flow of fluid within the conduit line and/or prevent movement of a cable within the conduit line. For instance, the conduit line may comprise a coaxial cable and sufficient crimping of the outer conduit prevents movement of the inner cable. This has applications in the aerospace (mechanical wire operated controls), automotive (throttle cables, etc.), nuclear (mechanically operated damper gates), and other industries.

Turning to FIG. 1, illustrated is an exemplary embodiment of a modification valve 100 configured to modify a conduit line. The modification valve 100 comprises an elongated body 102 formed of a material that changes shape based on the external environment, a passageway 104 to accommodate a conduit line 106, and means 108 for modifying the conduit line 106 as the elongated body 102 changes shape. Any modification can be made to the conduit line 106, such as crushing, deforming, cutting, and/or the like. For instance, as the elongated body 102 contracts due to a threshold temperature being reached, the means 108 for modifying the conduit line 106 can clamp down on the conduit line 106 crimping a portion of the conduit line 106 to prevent flow through the conduit line 106.

The elongated body 102, the passageway 104, and/or the means 108 for modifying the conduit line 106 can be placed in any suitable arrangement that results in modification of the conduit line 106 in response to the elongated body 102 changing shape. For instance, the elongated body 102 can extend along a first axis and the passageway 104 (and by extension the conduit line 106) can extend along a second axis that is different from the first axis, e.g. the first axis and the second axis are perpendicular. The means 108 for modifying the conduit line 106 can be secured to the elongated body 102; such that, as the elongated body 102 contracts along the first axis, the means 108 for modifying the conduit line 106 moves along the first axis to modify the conduit line 106.

The modification valve 100 can include any suitable number of elongated bodies 102. Moreover, the elongated bodies 102 can be placed in any suitable arrangement with respect to each other. For instance, in the embodiment illustrated in FIG. 1, the modification valve 100 includes two elongated bodies, a first elongated body 110A and a second elongated body 110B, that are arranged in parallel. The modification valve 100 may further include one or more structures that assist in holding the elongated bodies 102 in the desired arrangement. Discussion will now be made with respect to the first elongated body 110A, however these features can be employed with regard to any of the elongated bodies 102 in the modification valve 100.

The first elongated body 110A can take any suitable shape for modifying the conduit line 106 during contraction of the first elongated body 110A. For instance, in the embodiment illustrated in FIG. 1, the first elongated body 110A has a cylindrical dumbbell shape with a thicker section at each end and a thinner section extending therebetween. In another embodiment, the elongated body can have a uniform cross-section along the length of the body. In yet another embodiment, the elongated body can be telescoping along its length. The size and/or shape of the elongated body can depend on any number of factors, such as the material(s) used to form the elongated body, the size of the modification valve 100, the size of the conduit line 106, the modification being made to the conduit line 106, and/or the like.

Moreover, the first elongated body 110A can be made of any material that changes shape based on the external environment. In one example, the material can be selected to permanently deform in response to an external condition. In another example, the material can be selected to deform in response to an external condition and then to return to a pre-deformed shape in the absence of the external condition. In one embodiment, the first elongated body 110A can be formed of shape memory alloy that deforms at one temperature and then returns to its pre-deformed shape at another temperature. For instance, the shape memory alloy can contract along a length of the first elongated body 110A at 160° C. and to return to the pre-deformed shape below that temperature. Any suitable shape memory alloy can be employed, such as nickel-titanium; copper-aluminum-nickel; alloying zinc, alloying copper, alloying gold, alloying iron, and/or the like. In another embodiment, the first elongated body 110A can be formed of a material that deforms in response to humidity, air pressure, x-ray radiation, microwave radiation, neutron flux, and/or the like.

Where the modification valve 100 comprises a plurality of elongated bodies, such as illustrated in FIG. 1, the shape and/or size of the elongated bodies can have similar shape and size or can vary. In the embodiment illustrated in FIG.

1, the first elongated body 110A and the second elongated body 110B comprise cylindrical dumbbell shaped bodies of similar size. Moreover, the plurality of elongated bodies can be made of similar material and/or the material can vary. For instance, the first elongated body 110A and the second elongated body 110B can both be made nickel titanium shape memory alloy. In another example, the first elongated body 110A is made of a first material and the second elongated body 110B is made of a second material that is different from the first material.

The passageway 104 can be formed by any suitable structures for holding the conduit line 106 for modification by the modification valve 100. More particularly, the passageway 104 can be configured to restrain the conduit line 106 in a particular position to permit modification of the conduit line 106 by the modification valve 100. In the embodiment illustrated in FIG. 1, the passageway 104 is formed by a first passageway component 112 and a second passageway component 114 that are secured to each other, such as via a bolt as illustrated in FIG. 1. The first passageway component 112 and the second passageway component 114 can each have an indentation that when aligned form the passageway 104. The indentation can take any suitable shape for forming the passageway 104 and the shape and/or size of the passageway 104 may depend on the conduit line 106 or may be independent thereof.

The passageway 104 can be secured to the elongated body 102 to maintain the orientation of the conduit line 106 with respect to the elongated body 102 as the elongated body 102 contracts. For instance, the first passageway component 112 and/or the second passageway component 114 can be shaped to surround and/or enclose a portion of the first elongated body 110A and/or a portion of the second elongated body 110B to secure the passageway 104 at a particular orientation. In the embodiment illustrated in FIG. 1, the second passageway component 114 is shaped to surround and accommodate a thicker end of the first elongated body 110A and a thicker end of the second elongated body 110B.

As briefly mentioned above, the modification valve 100 can include structure(s) that help secure a plurality of elongated bodies 102 in a particular arrangement. Because the second passageway component 114 is secured to an end of both the first elongated body 110A and the second elongated body 110B; in addition to securing the passageway 104, the second passageway component 114 can hold the first elongated body 110A and the second elongated body 110B in the parallel arrangement. The modification valve 100 may further include a stabilizer bar 116 to assist in aligning the first elongated body 110A and the second elongated body 110B. The stabilizer bar 116 can be attached to any suitable portion(s) of the first elongated body 110A and/or the second elongated body 110B. For instance, in the illustrated embodiment, the stabilizer bar 116 is secured at a thicker end of the first elongated body 110A and a thicker end of the second elongated body 110B.

In addition to assisting in aligning the first elongated body 110A and the second elongated body 110B, the stabilizer bar 116 can be designed to transmit force resulting from contraction of the first elongated body 110A and/or the second elongated body 110B to the means 108 for modifying the conduit line 106. To this end, the modification valve 100 may further include a pole 118 extending between the stabilizer bar 116 and the means 108 for modifying the conduit line 106. The modification valve 100 may further include a centering structure 120 at the first passageway component 112 that helps center the pole 118 for contact with the means 108.

In order to maximize the amount of force used to modify the conduit line 106, the pole 118 can be preloaded to cause the means 108 to abut against the conduit line 106. The pole 118 can be preloaded by any suitable mechanism. In the illustrated embodiment, a screw 122 is threaded through the stabilizer bar 116 and presses on the pole 118. The screw 122 can be selectively rotated in the stabilizer bar 116 to achieve a desired preload on the pole 118. In order to prevent the preload inadvertently increasing and/or decreasing, the screw 122 can be secured in a specific position within the stabilizer bar 116. For instance, a locking adhesive may be applied to the screw 122 and/or threads in the stabilizer bar 116. In another example, a second screw 124 extends through a side of the stabilizer bar 116 to intercept the screw 122.

The means 108 for modifying the conduit line 106 can take any suitable shape and/or comprise any suitable structure(s) for modifying the conduit line 106. The shape and/or structure(s) of the means 108 may depend on the desired modification being made to the conduit line 106. In one example, the means 108 can be shaped to crimp the conduit line 106. In another example, the means 108 can be shaped to sever the conduit line 106.

Figure 2:
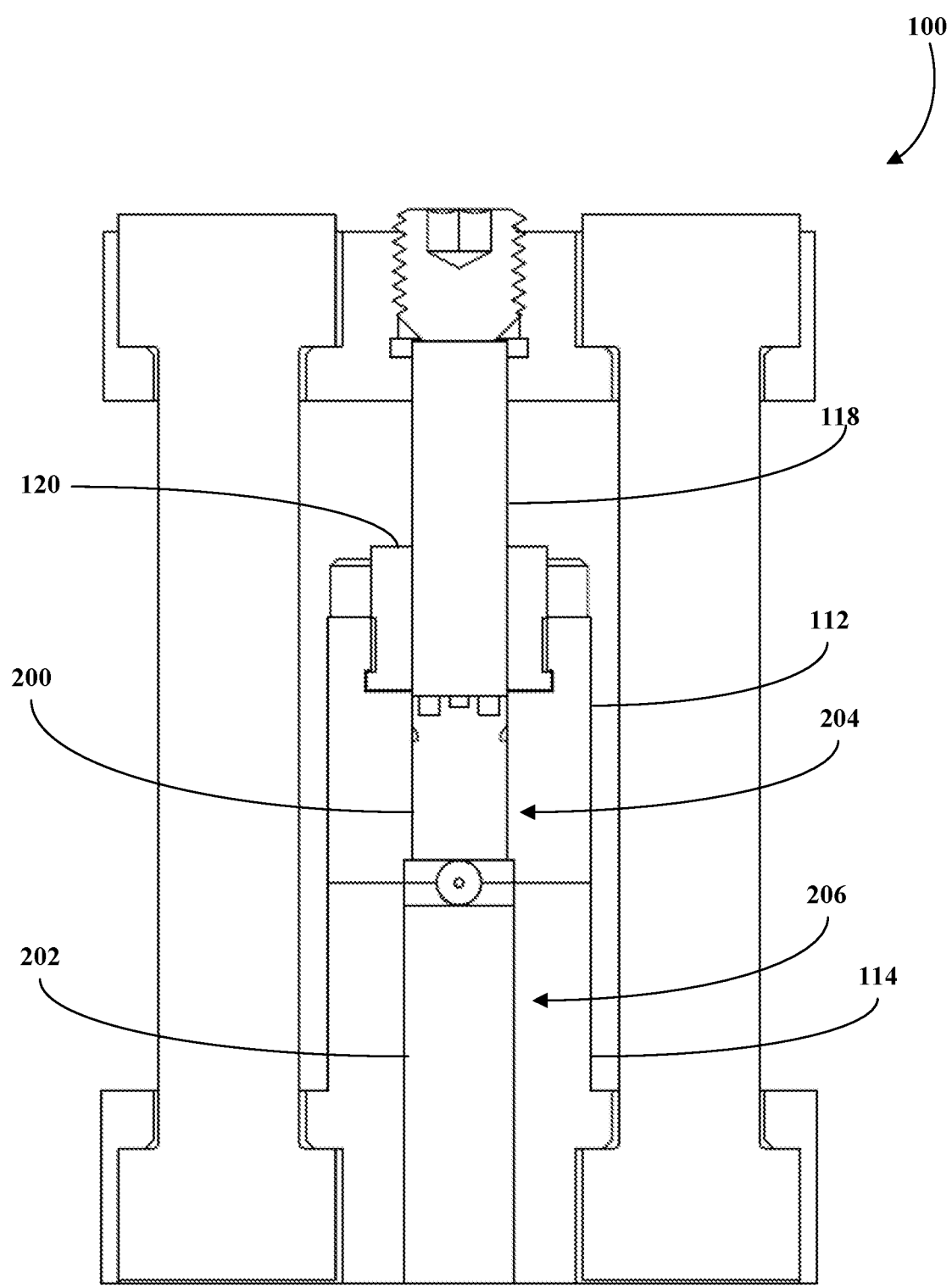
FIG. 2 illustrates another exemplary passive tube closure valve.

Turning now to FIG. 2, illustrated is a cross-section of the modification valve 100. In the illustrated embodiment, the means 108 comprises a first modifying structure 200 arranged on a first portion of the passageway 104 and a second modifying structure 202 arranged on a second portion of the passageway 104. The first portion and the second portion may be opposite one another, as illustrated, or may be non-opposite as desired.

The first modifying structure 200 may be held in place at the first portion by way of the first passageway component 112. Similarly, the second modifying structure 202 may be held in place at the second portion by way of the second passageway component 114. More particularly, the first passageway component 112 may include a bore 204 extending from an outer surface to its indentation shaped to accommodate the first modifying structure 200. The first modifying structure 200 may extend for any desired length within the bore 204. In the illustrated embodiment, the first modifying structure 200 extends along a portion of the bore 204 and the pole 118 extends along the remaining portion of the bore 204. The bore 204 may have a uniform cross-section along its length or the cross-section may vary. For instance, in the illustrated embodiment, the bore 204 includes a first section with a first cross-section to accommodate the first modifying structure 200 and the pole 118 and a second portion with a second larger cross-section that accommodates both the pole 118 and the centering structure 120 that surrounds the pole 118.

In another example, the second passageway 114 may similarly include a bore 206 extending from an outer surface to its indentation shaped to accommodate the second modifying structure 202. Similar to the first modifying structure 200, the second modifying structure 202 can extend for any desired length within the bore 206. In the illustrated embodiment, a portion of the second modifying structure 202 extends along the entire length of the bore 206. The second modifying structure 202 may be secured within the bore 206 by any suitable structure and may also be preloaded similar to the pole 118 discussed above.

As mentioned above, the first modifying structure 200 and the second modifying structure 202 can take any suitable shape for modifying the conduit line 106. The shape and/or size may depend on the desired modification being made to the conduit line 106. For instance, the first modifying structure 200 may have a first shape for a first type of modification and a second shape for a second type of modification.

Figure 3:
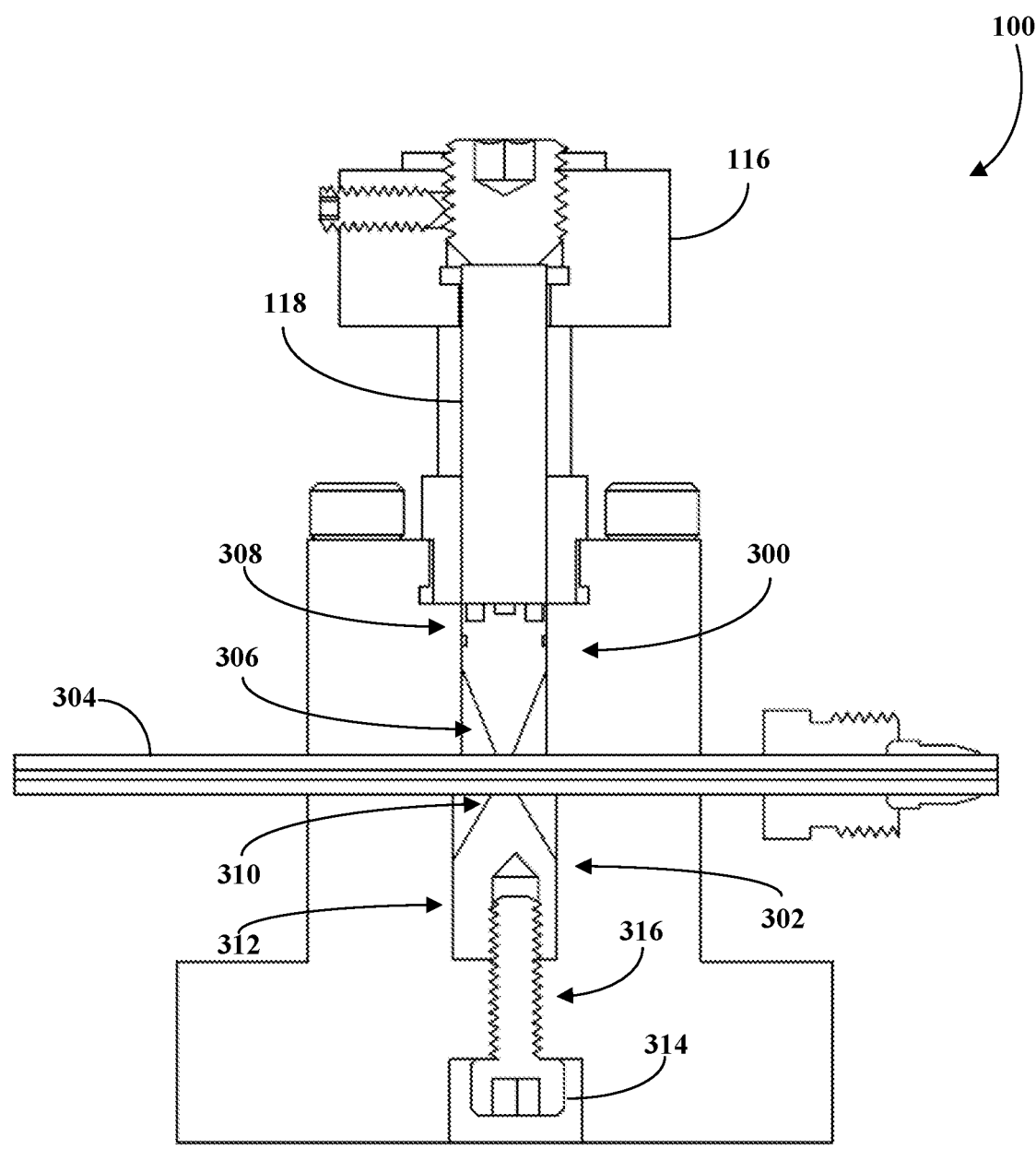
FIG. 3 illustrates yet another exemplary passive tube closure valve.

Turning to FIG. 3, illustrated is an embodiment where a first modifying structure 300 and a second modifying structure 302 are shaped for crimping a conduit line 304 as the elongated body(s) contracts. More particularly, the first modifying structure 300 comprises a plunger with a conical cross-section with a first narrow portion 306 that is adjacent the conduit line 304 and a second wider portion 308 that is adjacent the pole 118. The first portion 306 can be shaped to press on the conduit line 304 without severing it. In particular, a surface of the first portion 306 that presses on the conduit line 304 is flat to increase contact surface area with the conduit line 304.

As mentioned above, the second modifying structure 302 can have a cross-section similar to the first modifying structure 300 or it can vary. In the illustrated embodiment, similar to the first modifying structure 300, the second modifying structure 302 has a conical cross-section with a first narrow portion 310 that is adjacent the conduit line 304 and a second wider portion 312. The first portion 310 can also be shaped to press on the conduit line 304 without severing it. Similar to the first portion 306 of the first modifying structure 300, a surface of the first portion 310 that presses on the conduit line 304 is flat. The flat surface of the first portion 310 in the second modifying structure 302 can be similar in size to the flat surface of the first portion 306 of the first modifying structure 302 or can vary, as illustrated.

The flat surface of the first portion 306 of the first modifying structure 300 and/or the flat surface of the first portion 310 in the second modifying structure 302 can each be placed in contact with the conduit line 304 prior to contraction of the elongated body(s). As mentioned above, by placing the first modifying structure 300 and/or the second modifying structure 302 in contact with the conduit line 304 prior to contraction of the elongated body(s), the modification valve 100 can maximize the amount of force transmitted from the contraction of the elongated body(s) onto the conduit line 304. Any structure and/or structures can be used to place first modifying structure 300 and/or the second modifying structure 302 in contact with the conduit line 304.

As discussed above, the pole 118 attached to the stabilizer bar 116 can be preloaded to press the first modifying structure 300 into contact with the conduit line 304. In the illustrated embodiment, a screw 314 is used to place the second modifying structure 302 in contact with the conduit line 304. More particularly, a bore 316 in the second passageway component 114 can have varied cross-sectional sizes with a first larger cross-section that accommodates the second modifying structure 302 and a smaller second cross-section that receives the screw 314 and keeps the second modifying structure 302 within the bore 316. The screw 314 can be threaded through the smaller cross-section to abut the second portion 312 of the second modifying structure 302 and/or extend into the second modifying structure 302 (as illustrated) to preload the second modifying structure 302.

Figure 4:
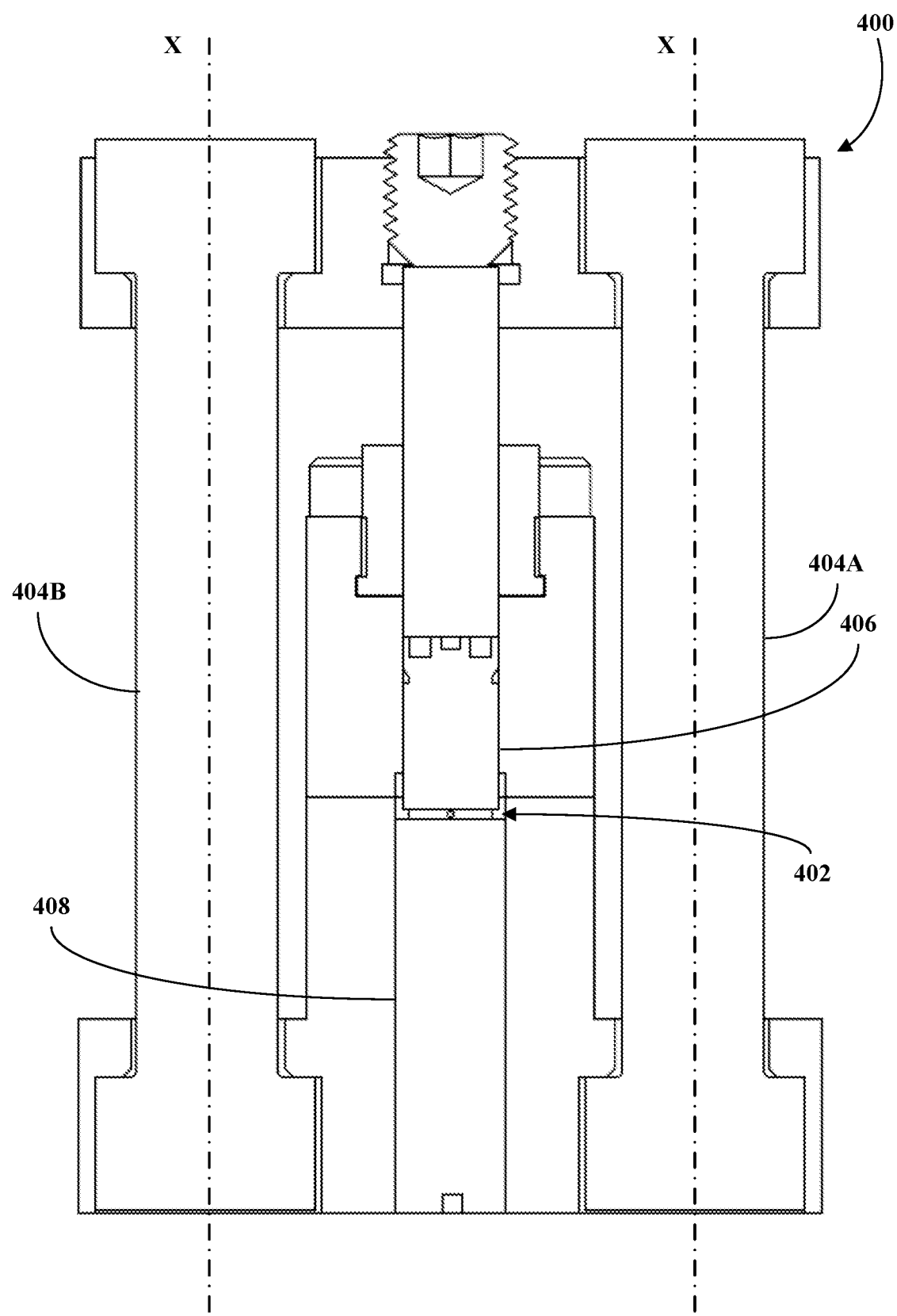
FIG. 4 illustrates a further passive tube closure valve.

Turning now to FIG. 4, illustrated is a modification valve 400 in the contracted position. In the illustrated embodiment, a portion of the conduit line 402 is crimped to prevent or limit flow through the portion of the conduit line 402. More particularly, as a first elongated body 404A and a second elongated body 404B each contract along an axis X, a first modifying structure 406 and/or a second modifying structure 408 are pressed into the conduit line 402 to crimp the portion of the conduit line 402. In one embodiment, both the first modifying structure 406 and the second modifying structure 408 move in response to the contraction of the first elongated body 404A and the second elongated body 404B. In another embodiment, the modification valve 100 can be secured such that only one of the modifying structures (e.g., the first modifying structure 406) moves as the first elongated body 404A and the second elongated body 404B contract.

Because shape memory alloy expands to return to a pre-deformed shape once the instigating condition ends, the modification valve 100 may be further configured to maintain the modification to the conduit line even after expansion. For instance, the modification valve 100 may be configured lock one or more of the modifying structures in the contracted position to prevent the conduit line from returning to an unmodified state.

Figure 5:
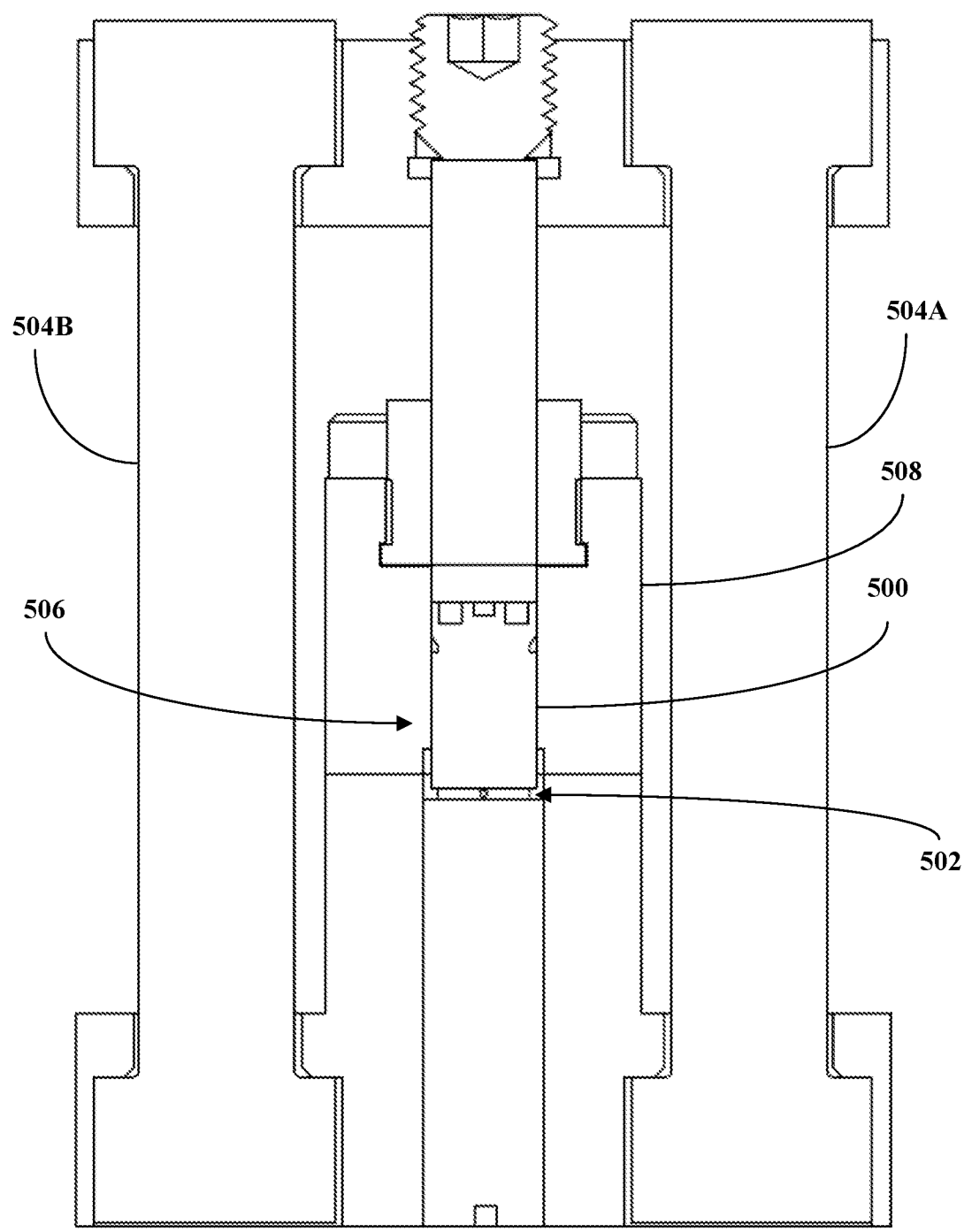
FIG. 5 illustrates a yet further exemplary passive tube closure valve.

Turning now to FIG. 5, illustrated is one embodiment where a first modifying structure 500 is locked in place subsequent to a conduit line 502 being modified. More particularly, the first modifying structure 500 remains in a contracted modifying position even after a first elongated body 504A and a second elongated body 504B return to their respective pre-deformed shapes. The first modifying structure 500 can be locked in this contracted modifying position via any suitable locking system. For instance, the locking system may comprise structure(s) extending from an inner wall of a bore 506 in a first passageway component 508 that engages an indentation in the first modifying structure 500 when the first modifying structure 500 is in the contracted modifying position illustrated in FIG. 5. The interaction of the structure and the indentation can prevent the first modifying structure 500 from moving. In another embodiment, the inner wall of the bore 506 may have one or more barbs that extend from the inner wall of the bore 506 and the first modifying structure 500 includes a corresponding barb(s) that interlocks with the barb(s) in the bore 506 at the contracted modifying position to prevent movement of the first modifying structure 500. In a further embodiment, the first modifying structure 500 and/or the bore 506 may be tapered such that interaction of the tapered surface(s) at the contracted modifying position requires a threshold amount of force (e.g., 30,000 lbs. of force) to move the first modifying structure 500 from the contracted modifying position. In a yet further example, multiple different locking system types can be used simultaneously.

Figure 6:
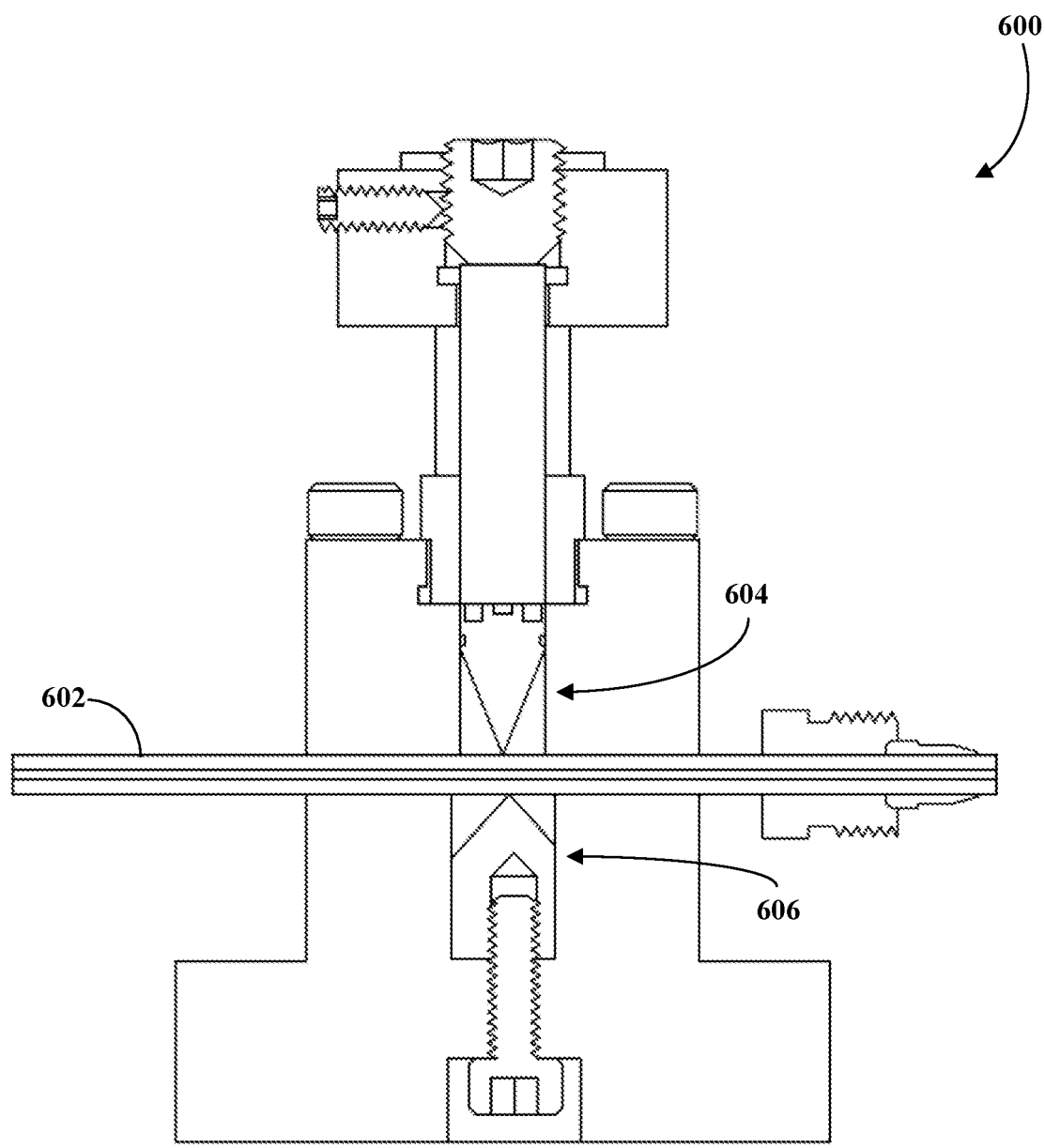
FIG. 6 illustrates another exemplary passive tube closure valve.

As briefly mentioned above, different modifications can be made to the conduit line via the modification valve 100. For instance, illustrated in FIG. 6 is a modification valve 600 configured to sever a conduit line 602. The modification valve 600 can include a first modifying structure 604 with a sharp edge in contact with the conduit line 602 and a second modifying structure 606 with a sharp edge in contact with the conduit line 602. The sharp edge of the first modifying structure 604 and the sharp edge of the second modifying structure 606 may be opposite one another and/or may be offset from one another to shear the conduit line 602. To minimize potential for unintentional severing of the conduit line 602, the sharp edge of the first modifying structure 604 and/or the sharp edge of the second modifying structure 606 may have a small amount of rounding. The rounding can be used to prevent severing of the conduit line 602 by the first modifying structure 604 and/or the second modifying structure 606 prior to contraction of the elongated body(s) in the modification valve 600.

Figure 7:
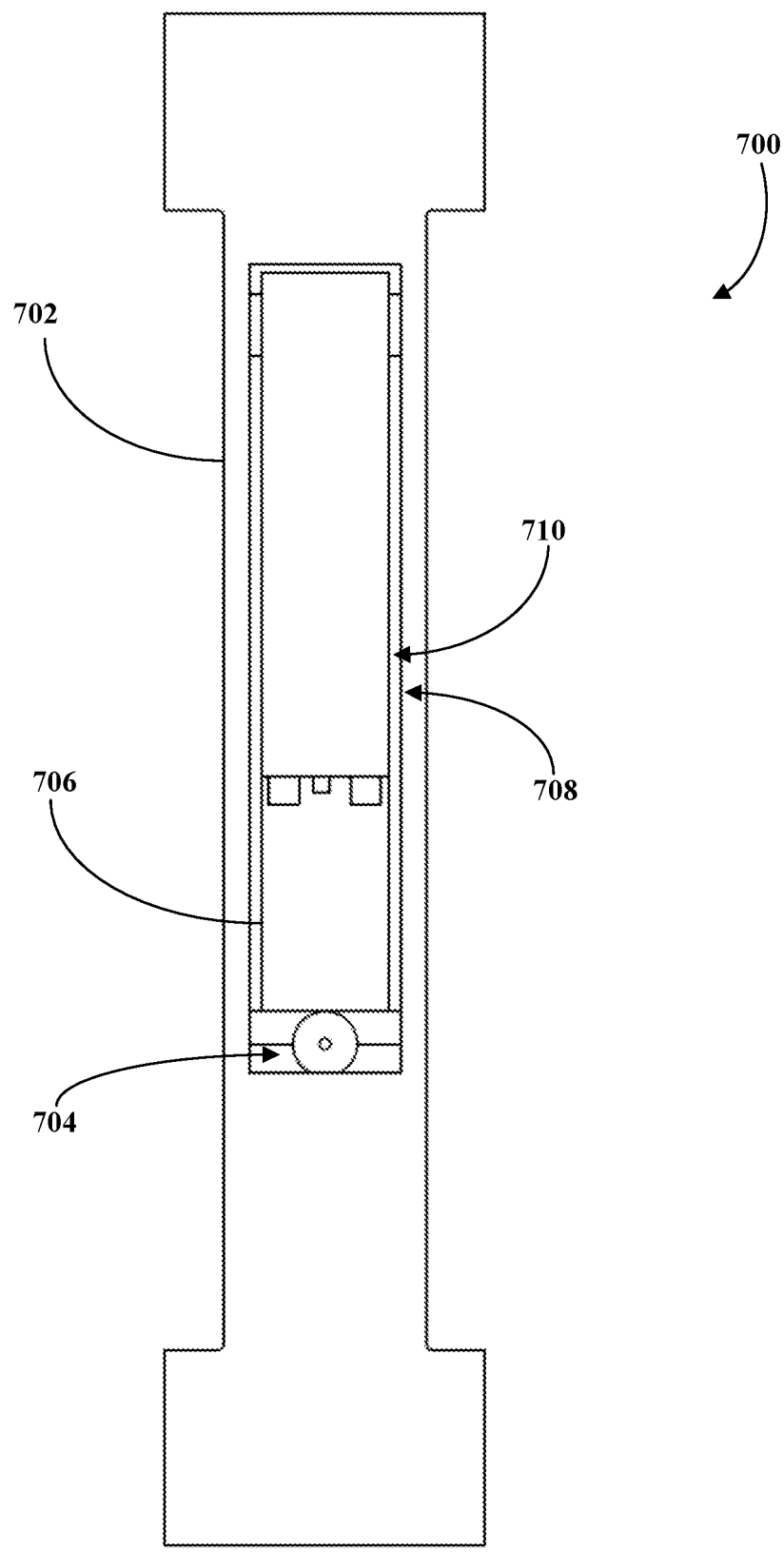
FIG. 7 illustrates yet another exemplary passive tube closure valve.

As briefly mentioned above, the elongated body(s), the means for modifying the conduit line, and the passageway can be arranged in any suitable arrangement. Illustrated in FIG. 7 is an embodiment of a modification valve 700 where the modifying structure and the passageway are located within the elongated body. More particularly, the modification valve 700 includes an elongated body 702 with a passageway 704 extending through the elongated body 702 and a modifying structure 706 within an interior of the elongated body 702. In order to accommodate the modifying structure 706, the elongated body 702 includes a bore 708 extending within the interior of elongated body 702. The bore 708 can take any suitable size and/or shape for accommodating the modifying structure 706. The bore 708 can extend to accommodate a pole 710 (similar to the pole described above) that presses on the modifying structure 706 and transfers force generated by contraction of the elongated boy 702 to the modifying structure 706.

Figure 8:
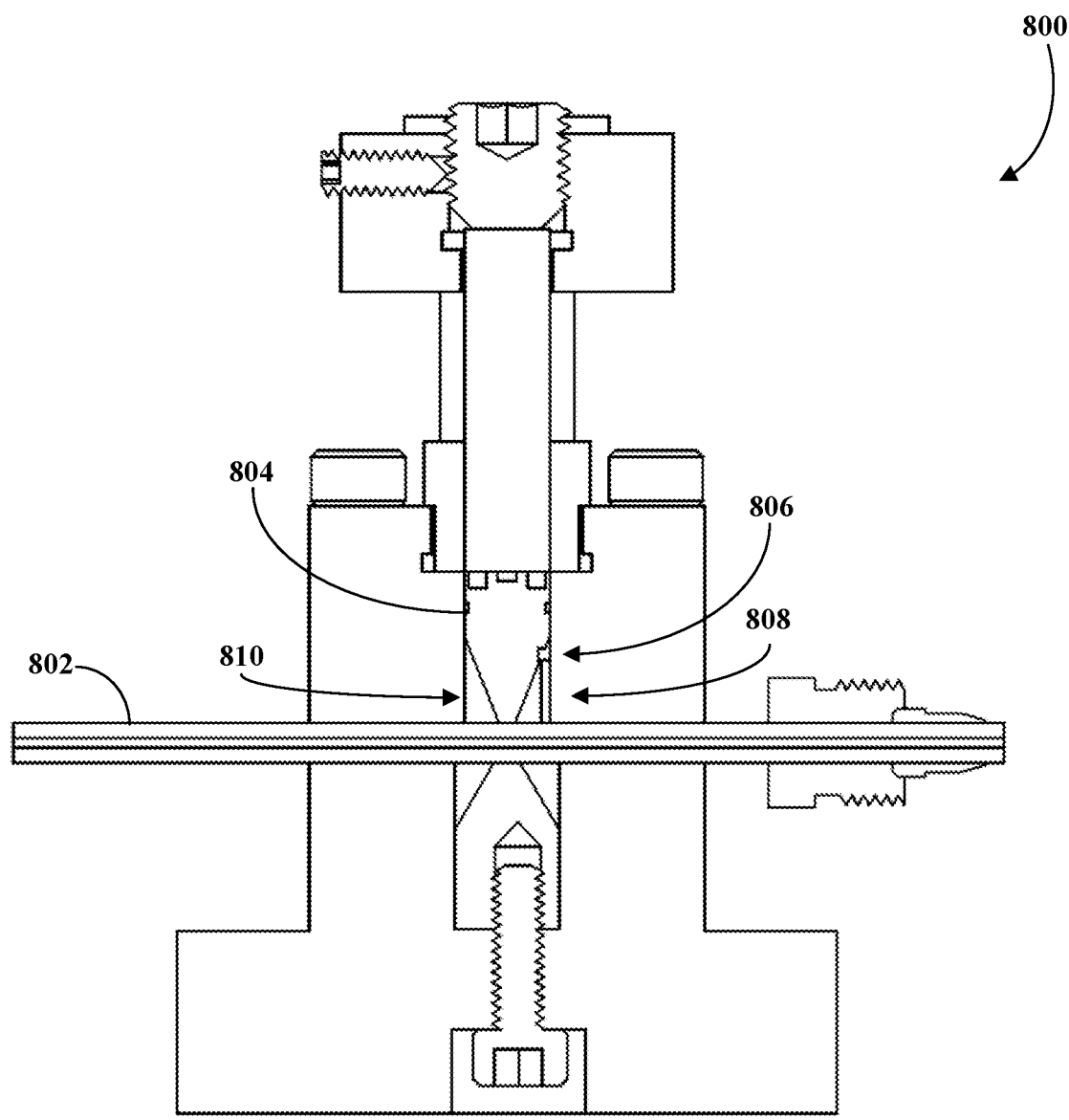
FIG. 8 illustrates a further exemplary passive tube closure valve.

The modification valve can be further configured to partially modify the conduit line. For instance, instead of crimping the conduit line to fully prevent flow through the conduit line, the modification valve can be configured to partially crimp the conduit line. Turning to FIG. 8, illustrated is a modification valve 800 configured to partially crimp a conduit line 802. The modification valve 800 includes a modifying structure 804 with an indentation 806 that interacts with a step 808 in bore 810 to prevent further downward movement of the modifying structure 804.

Figure 9:
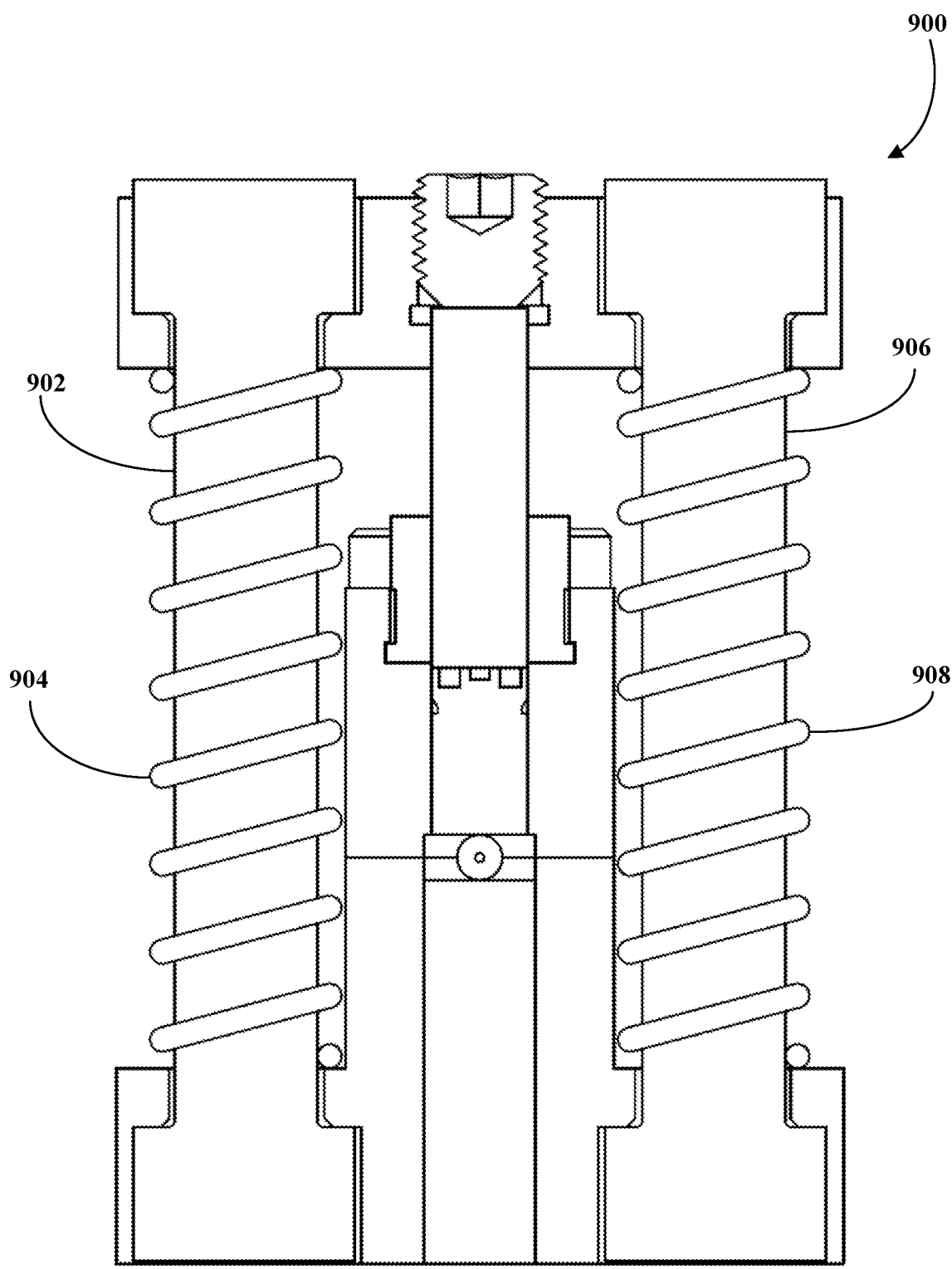
FIG. 9 illustrates a yet further exemplary passive tube closure valve.

In the previous embodiments, contraction of the elongated body(s) relied on the external environment. In another embodiment, the modification valve includes a mechanism (s) to cause contraction of the elongated body(s). The modification valve with the mechanism(s) can be employed in environments where it is desirable to have more control over when the elongated body(s) contracts. Illustrated in FIG. 9 is a modification valve 900 with mechanisms to warm an elongated body(s) to a threshold temperature to cause contraction of the elongated body(s). More particularly, the modification valve 900 includes a first elongated body 902 with a first heater 904 secured thereto and a second elongated body 906 with a second heater 908 secured thereto. The first heater 904 and/or the second heater 908 permits for temperature control of the first elongated body 902 and the second elongated body 906, respectively, to control when the first elongated body 902 and/or the second elongated body 906 contract.

The modification valve may be further configured to send fluid traveling in the conduit line to a second location during the modification. For instance, the modification valve may include a second passageway to transfer the fluid to the second location. The second location can comprise a vent to release the fluid and/or a valve to send the fluid to a second conduit line. For instance, the modification valve can vent a gas from the conduit line at a particular temperature.

Figure 10:
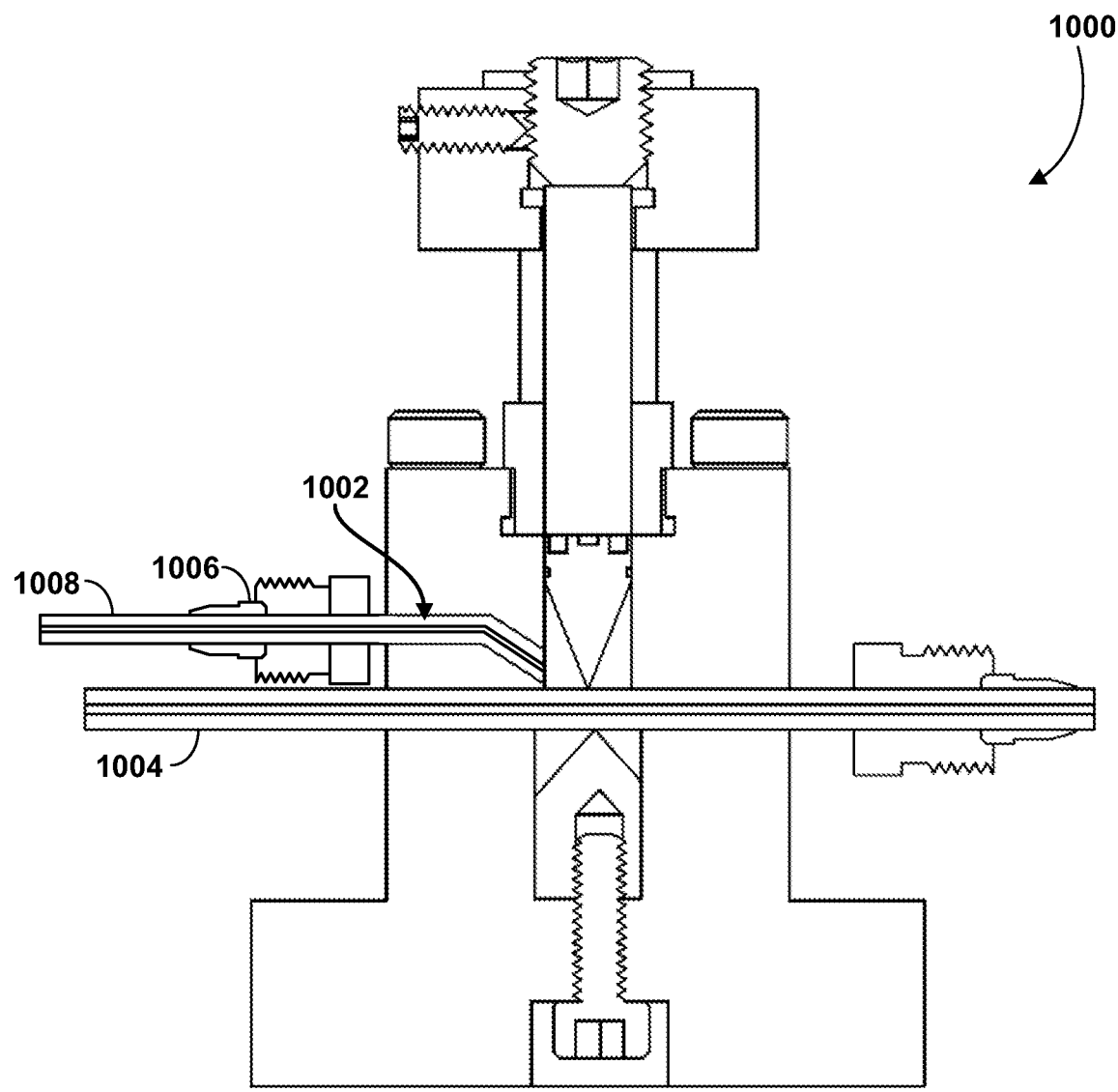
FIG. 10 illustrates another exemplary passive tube closure valve.

Turning to FIG. 10, illustrated is an embodiment of a modification valve 1000 with a second passageway 1002 to vent fluid from a conduit line 1004 after modification thereof. The modification valve 1000 can include modifying structure(s) that sever the conduit line 1004, such that fluid can leave the conduit line 1004 and enter the second passageway 1002. In the illustrated embodiment, the second passageway 1002 is configured to vent the fluid. Flow of the fluid from the second passageway 1002 may be controlled by a valve 1006 to a second conduit line 1008.

Figure 11:
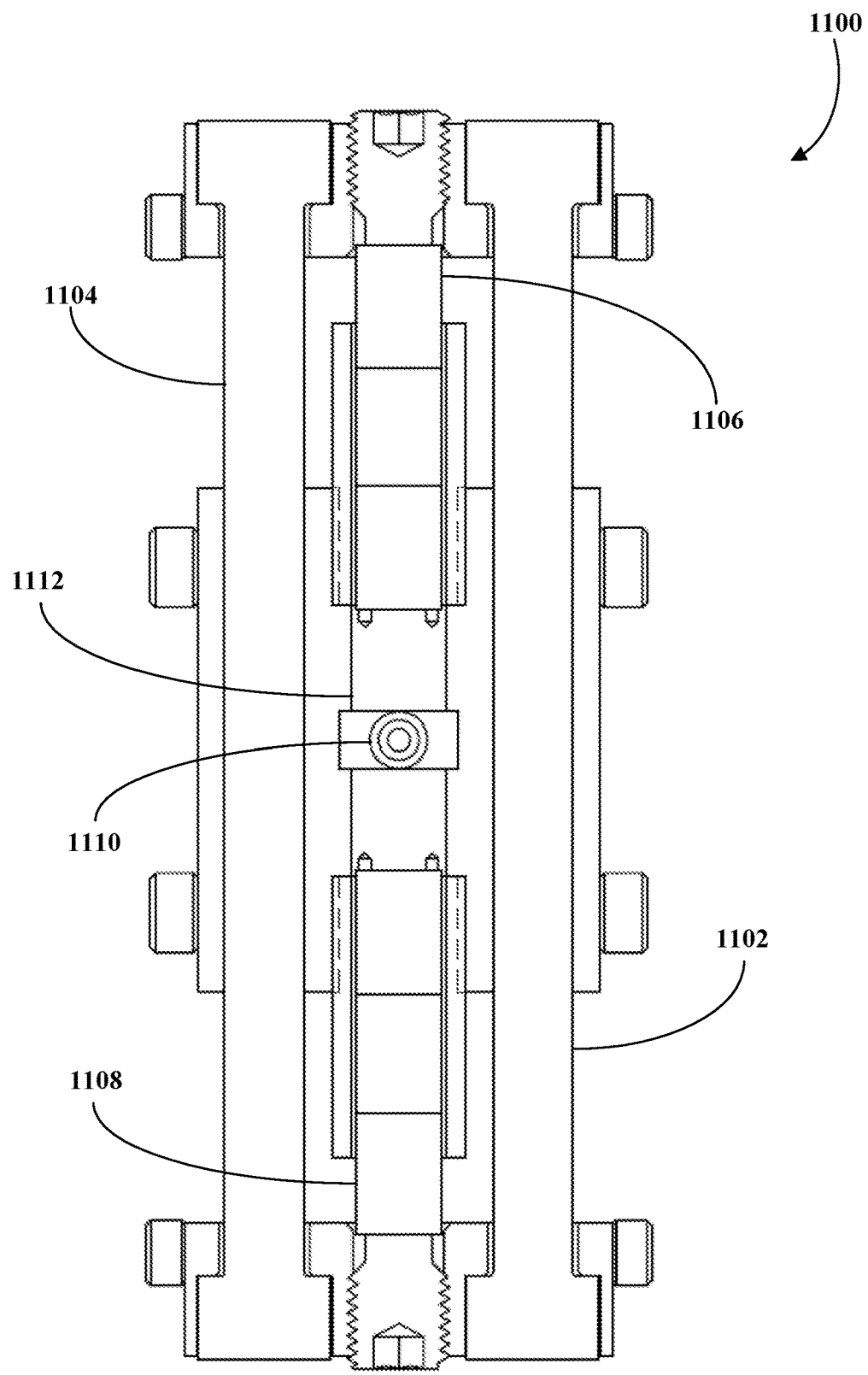
FIG. 11 illustrates a further exemplary passive tube closure valve.

In addition to or in lieu of using an elongated body formed of a material that contracts in response to a particular environmental condition, the modification valve can include an elongated body(s) that deforms by expanding in response to the particular environmental condition. Illustrated in FIG. 11 is a modification valve 1100 that includes a first elongated body 1102 and a second elongated body 1104 that are formed of a first material and a third elongated body 1106 and a fourth elongated body 1108 that are formed of a second material. The first material can be configured to contract axially in response to an environmental condition while the second material can be configured to expand axially in response to the same environmental condition. By including the axially expanding third elongated body 1106 and fourth elongated body 1108, the modification valve 1100 need not rely only on the contraction of the first elongated body 1102 and the second elongated body 1104 to modify a conduit line 1110. The expanding elongated body may be placed in suitable position within the modification valve 1100. For instance, in the illustrated embodiment, the third elongated body 1106 presses on a first modifying structure 1112 and is used in a manner similar to that of the pole described above in addition to the expansive nature of the third elongated body 1106.

The modification valve can be made of any suitable material and different material may be used for different parts of the modification valve. For instance, as described above, the elongated body(s) may be formed of a material that contracts in response to a particular environmental condition and returns to the pre-deformed shape in the absence of that condition. The material chosen may depend on the modification being made to the conduit line, the type of conduit line, the matter traveling in the conduit line, the environment the modification valve will be in, and/or the like. For instance, where the conduit line is transmitting electricity and the modification valve is configured to sever the conduit line to stop transmission, the modification valve may include insulating material to prevent transmission of the electricity within the modification valve after severing the conduit line.

Figure 12:
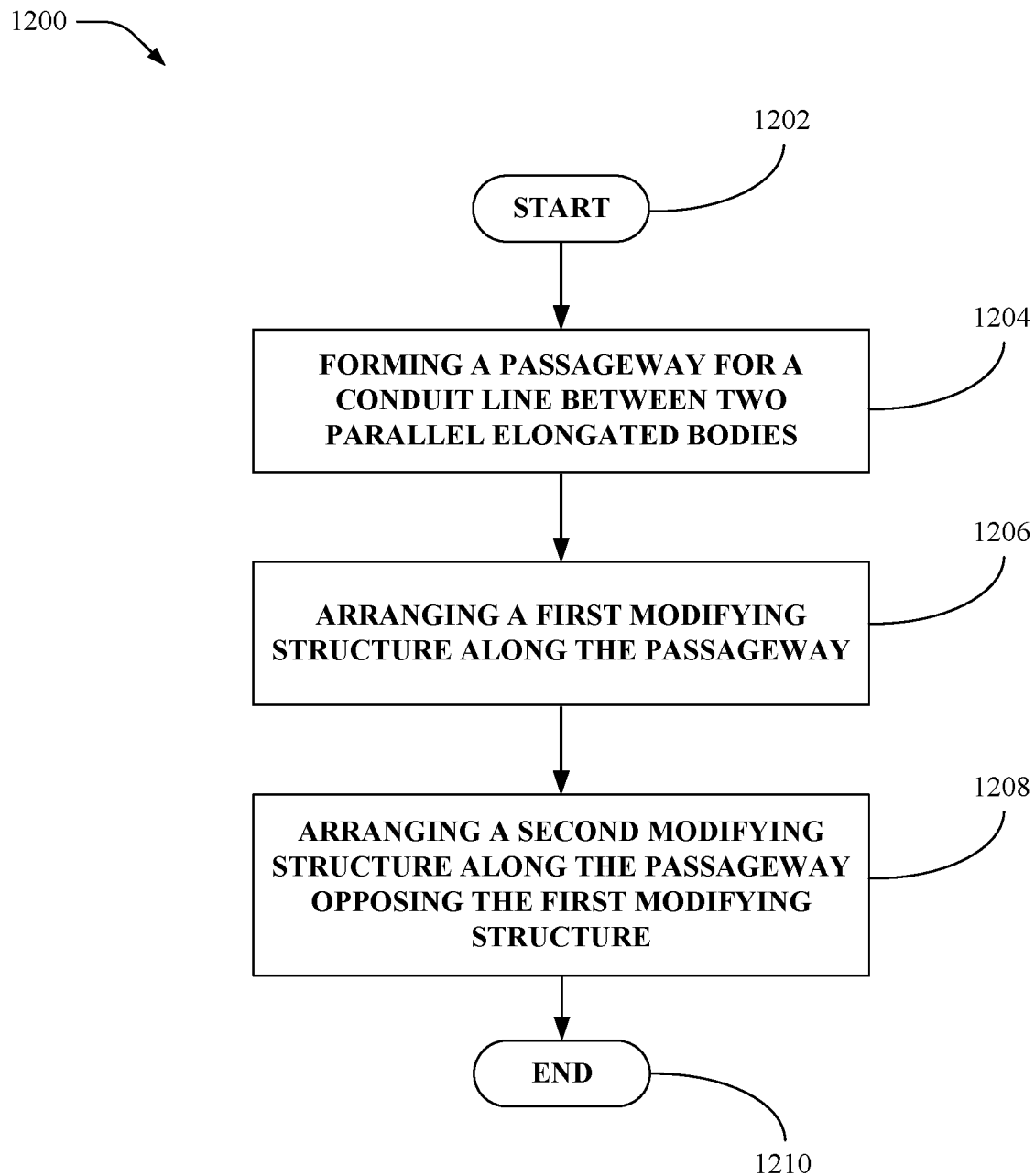
FIG. 12 is a flow diagram that illustrates an exemplary methodology for forming a passive tube closure valve.

FIG. 12 illustrates an exemplary methodology relating forming a passive tube closure valve. While the methodology is shown as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Referring now to FIG. 12, an exemplary methodology 1200 is illustrated. The methodology 1200 starts at 1202, and at 1204, a passageway is formed for a conduit line between two parallel elongated bodies. The elongated bodies extend along a first axis and the passageway extends along a second axis different from the first axis. The elongated bodies comprise a shape memory alloy with a threshold contraction along the first axis at a threshold temperature. At 1206, a first modifying structure is arranged along the passageway. The first modifying structure is connected to a first end of the elongated bodies. At 1208, a second modifying structure is arranged along the passageway. The first modifying structure and the second modifying structure are arranged on opposing portions of the passageway. The second modifying structure is connected to the other end of the elongated bodies. Contraction of the elongated bodies causes the first modifying structure and the second modifying structure to move towards each other and movement of at least one of the first modifying structure or the second modifying structures is configured to modify the conduit line. The methodology 1200 concludes at 1210.

In an embodiment, the methodology 1200 further includes securing a stabilizer bar between the first end of the elongated bodies. The methodology 1200 further includes securing a pole between the stabilizer bar and the first modifying structure to connect the first modifying structure to the first end of the elongated bodies.

In one version of the embodiment, the methodology 1200 further includes preloading the pole via a screw passing through the stabilizer bar.

In another embodiment, the methodology 1200 further includes securing a heater to at least one of the elongated bodies from the two elongated bodies.

In a further embodiment of the methodology 1200, forming the passageway comprises securing a first passageway component and a second passageway component together. The first passageway component includes a bore extending from an outer surface of the first passageway component to the passageway. The bore guides movement of the first modifying structure during contraction of the elongated body What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A passive tube closure valve comprising:
    an elongated body extending along a first axis, wherein the elongated body comprises a shape memory alloy with a threshold contraction along the first axis at a threshold temperature;
    a passageway extending along a second axis different from the first axis, wherein the passageway is shaped to surround a conduit line extending along the second axis;
    a first modifying structure on a first portion of the passageway; and
    a second modifying structure on a second portion of the passageway opposite the first modifying structure;
    wherein the first modifying structure is connected to a first end of the elongated body and the second modifying structure is connected to a second end of the elongated body;
    wherein contraction of the elongated body causes the first modifying structure and the second modifying structure to move towards each other, wherein movement of at least one of the first modifying structure or the second modifying structures is configured to permanently modify the conduit line.

2. The closure valve of claim 1, further comprising:
    a second elongated body, wherein the elongated body and the second elongated body are arranged in parallel, wherein the passageway is arranged to extend between the elongated body and the second elongated body.

3. The closure valve of claim 2, further comprising:
    a stabilizer bar extending between an end of the elongated body and an end of the second elongated body, wherein the stabilizer bar is shaped to move along the first axis with the end of the elongated body as the elongated body contracts; and
    a pole extending between the stabilizer bar and the first modifying structure to cause the first modifying structure to move simultaneous with the stabilizer bar.

4. The closure valve of claim 3, further comprising:
    a screw in the stabilizer bar abutting the pole, wherein the screw provides a preload stress to the pole.

5. The closure valve of claim 1, wherein at least one of the first modifying structure or the second modifying structure comprises a plunger shaped to crimp the conduit line during contraction of the elongated body.

6. The closure valve of claim 1, wherein at least one of the first modifying structure or the second modifying structure comprises a cutting edge shaped to sever the conduit line during contraction of the elongated body.

7. The closure valve of claim 1, wherein the passageway is defined by a first passageway component and a second passageway component, wherein the first passageway component includes a bore extending from an outer surface of the first passageway component to the passageway, wherein the bore guides movement of the first modifying structure during contraction of the elongated body.

8. The closure valve of claim 7, wherein the bore and the first modifying structure include locking structures that secure the first modifying structure within the bore in a contracted state.

9. The closure valve of claim 7, wherein the bore includes a stop extending outwardly into the bore, wherein the first modifying structure includes a step that interacts with the stop preventing movement of the first modifying structure within the bore.

10. The closure valve of claim 1, further comprising a heater secured to the elongated body.

11. The closure valve of claim 1, further comprising an outlet valve, wherein the modification of the conduit line directs flow from the conduit line to the outlet valve.

12. The closure valve of claim 1, wherein the shape memory alloy comprises a nickel titanium alloy.

13. A method of forming a passive tube closure valve comprising:
    forming a passageway for a conduit line between two parallel elongated bodies, wherein the elongated bodies extend along a first axis and the passageway extends along a second axis different from the first axis, wherein the elongated bodies comprise a shape memory alloy with a threshold contraction along the first axis at a threshold temperature;
    arranging a first modifying structure along the passageway, wherein the first modifying structure is connected to a first end of the elongated bodies; and
    arranging a second modifying structure along the passageway, wherein the first modifying structure and the second modifying structure are arranged on opposing portions of the passageway, wherein the second modifying structure is connected to the other end of the elongated bodies;
    wherein contraction of the elongated bodies causes the first modifying structure and the second modifying structure to move towards each other, wherein movement of at least one of the first modifying structure or the second modifying structures is configured to permanently modify the conduit line.

14. The method of claim 13, further comprising:
    securing a stabilizer bar between the first end of the elongated bodies; and securing a pole between the stabilizer bar and the first modifying structure to connect the first modifying structure to the first end of the elongated bodies.

15. The method of claim 14, further comprising:
preloading the pole via a screw passing through the stabilizer bar.

16. The method of claim 13, further comprising:
securing a heater to at least one of the elongated bodies from the two elongated bodies.

17. The method of claim 13, wherein forming the passageway comprises securing a first passageway component and a second passageway component together, wherein the first passageway component includes a bore extending from an outer surface of the first passageway component to the passageway, wherein the bore guides movement of the first modifying structure during contraction of the elongated body.

18. A passive tube closure valve comprising:
two parallel elongated bodies, wherein each elongated body extends along a first axis, wherein each elongated body comprises a shape memory alloy with a threshold contraction along the first axis at a threshold temperature;
a passageway extending between the two elongated bodies, wherein the passageway extends along a second axis different from the first axis, wherein the passageway is shaped to surround a conduit line;
a first plunger on a first portion of the passageway; and
a second plunger on a second portion of the passageway, wherein the second portion is opposite the first portion;
wherein contraction of the elongated bodies causes the first plunger and the second plunger to move towards each other, wherein movement of first plunger and the second plunger permanently compresses space in the passageway.

19. The closure valve of claim 18, further comprising:
a first heater secured to one of the two elongated bodies; and
a second heater secured to another of the two elongated bodies.

20. The closure valve of claim 18, further comprising:
a stabilizer bar extending between parallel ends of the two elongated bodies, wherein the stabilizer bar is shaped to move along the first axis as the elongated bodies contract; and
a pole extending between the stabilizer bar and the first plunger to cause the first plunger to move simultaneous with the stabilizer bar.

* * * * *